Figure 2:
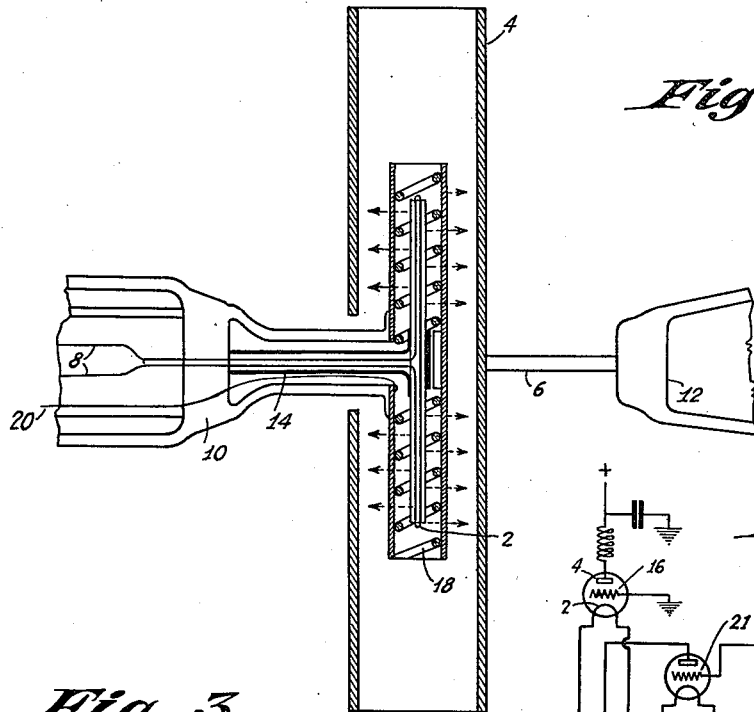

July 23, 1935. C. W. HANSELL 2,009,369
OSCILLATION GENERATION
Filed June 24, 1932  3 Sheets-Sheet 1
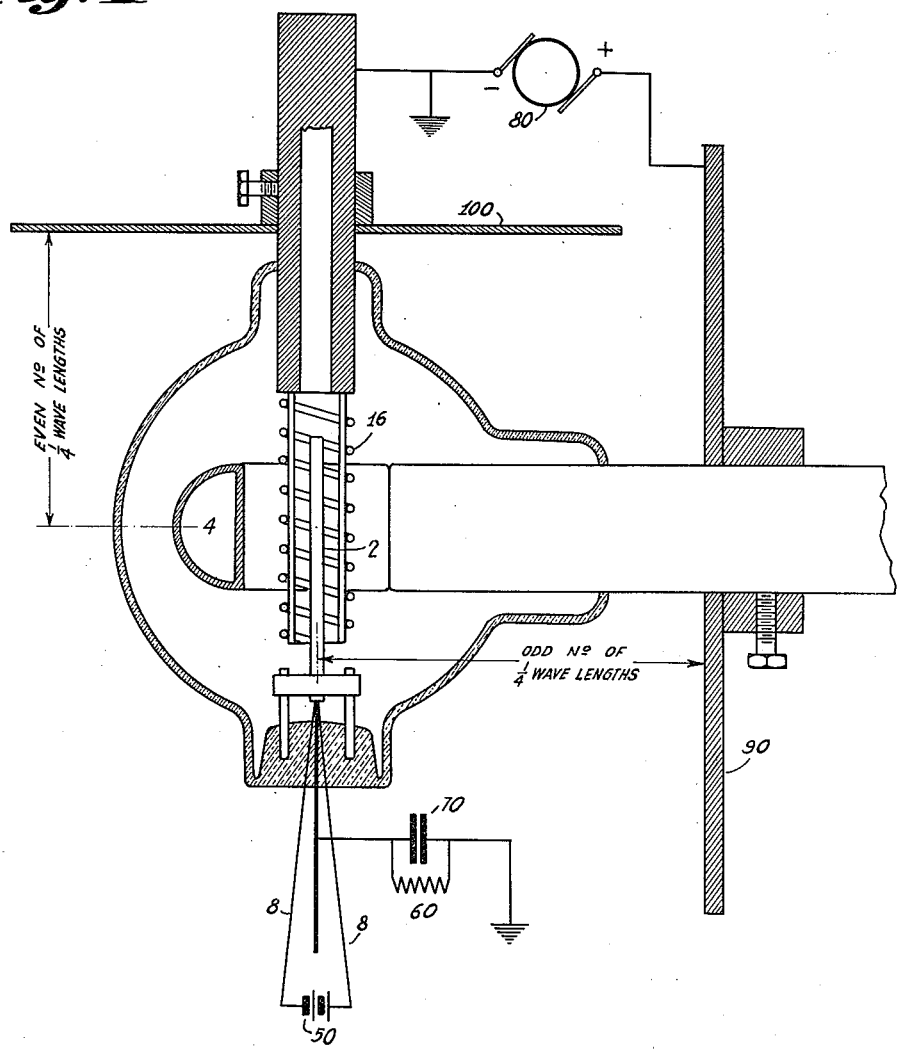
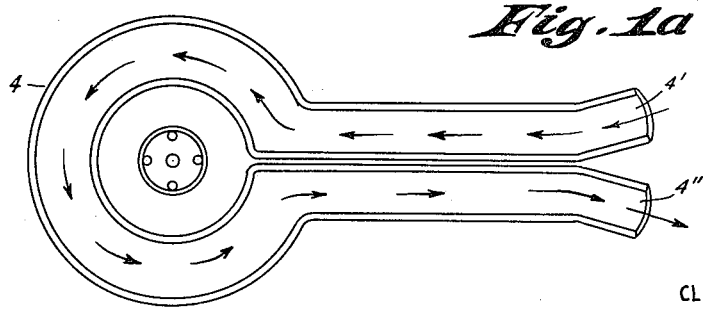
INVENTOR
CLARENCE W. HANSELL
BY
ATTORNEY July 23, 1935.  C. W. HANSELL  2,009,369
OSCILLATION GENERATION
Filed June 24, 1932  3 Sheets-Sheet 2

INVENTOR
CLARENCE W. HANSELL
BY
ATTORNEY

July 23, 1935.  C. W. HANSELL  2,009,369
OSCILLATION GENERATION
Filed June 24, 1932  3 Sheets-Sheet 3

INVENTOR
CLARENCE W. HANSELL
BY
ATTORNEY

Patented July 23, 1935

2,009,369

UNITED STATES PATENT OFFICE 2,009,369

OSCILLATION GENERATION

Clarence W. Hansell, Port Jefferson, N. Y., assignor to Radio Corporation of America, a corporation of Delaware Application June 24, 1931, Serial No. 546,450

22 Claims. (Cl. 250—36)

This invention relates to oscillation generation and has as its main object the provision of new and useful methods and means for generating ultra short waves.

Magnetron oscillators have been found useful for the generation of short electrical waves but they are subject to undesirable limitations in that the field magnets are much too heavy for use in portable equipment such as might be used on aircraft. The magnetron tube also has a long electron path relative to the anode to cathode spacing, because the electrons are made to take a spiral path in traveling from cathode to anode. This long path together with the finite velocity of the electrons sets a limit to the shortness of the wave length of oscillations generated thereby.

The oscillator of Barkhausen-Kurz, in which a three element vacuum tube is used with high positive potential on the grid and negative potential on the plate, is sufficiently light in weight for portable use on aircraft but is subject to the defect that the losses due to electron impact must be taken by the grid which is poorly suited for dissipation of energy. This low allowable energy dissipation on the grid prevents a high power output and sets a definite limit to the allowable voltages which, in turn, limit the electron velocity and prevent obtaining wave lengths as low as desired.

It is an object of the present invention to provide an ultra short wave oscillator having light weight and short electron path together with ability to stand high dissipation of energy due to electron impact so that much shorter waves and higher power may be obtained. This object is accomplished by employing an electron discharge device so designed and adjusted that electrons are attracted by the anode of the device only at a time when the oscillations of the anode circuit have raised the anode potential to a maximum. The time required for the electrons to reach the anode after they have been started toward it by the potential peak is then made substantially equal to the time of one half cycle of the anode oscillation or some integer times this amount of time so that the anode potential is near minimum or preferably negative at the time of electron impact.

Thus, when the tube is producing oscillations efficiently, the electrons will start toward the anode with low velocity, be accelerated to high velocity, by the anode potential, and then slowed down again when the anode swings negative so that they strike the anode at low velocity and cause low anode losses with correspondingly high power output efficiency. Thus I make use of the finite velocities of the electrons to cause the oscillations to take place.

In the ordinary three electrode tube efficient operation also requires anode current flow to the anode only when the anode potential is near a minimum. In the ordinary case this is accomplished by applying to the control electrode or grid of the tube sufficient alternating current potential to more than overcome the effect of the anode potential upon the anode current. In the oscillator which I now propose, the grid may remain at a fixed potential and only the anode has variations in potential at the output frequency. The time delay due to the finite velocities of the electrons is alone sufficient to provide the condition for efficient oscillation. However, in practice, the grid need not actually remain at fixed potential with respect to the filament but may have some potential variation at the output frequency. Depending upon circuit conditions this grid potential variation may help or detract from the operation of the tube but is not of prime importance in the production of oscillations. Preferably the radio frequency potential variation on the grid should be in phase with that of the anode so that it will assist in producing the oscillations. This phase relation is opposite to that required in the known types of vacuum tube oscillators and is peculiar to my present invention.

To carry out my invention it is possible to use a two electrode vacuum tube having only a cathode and an anode. Such a tube may be made to oscillate by causing anode current to flow and then tuning the anode circuit to a frequency such that the duration of one-half cycle is approximately equal to the time required for the electrons to pass from cathode to anode.

However, the two electrode tube is not an efficient oscillator and is limited in its operation to rather low anode voltages with correspondingly low output. A three electrode tube is capable of much greater efficiency and power because the use of negative potential on the grid permits the use of much higher anode voltages without causing limiting due to an insufficient number of electrons.

When a three electrode tube is used it is only necessary to apply sufficient anode voltage to overcome the effect of the grid in holding back the electrons and to tune the anode approximately to a frequency such that the time of a half cycle corresponds to the time required for an electron to move from the grid to the anode. Once the oscillations have started, the efficiency may be increased by increasing the negative potential on the grid or lowering the anode voltage or both. In general, when changing the grid and anode potentials the difference between them should be kept approximately constant in order that the time required for the electrons to traverse the grid to anode space may not change and so cause a change in the oscillation frequency. In other words, the anode to grid voltage is thought of as being fixed and it is the filament direct current potential which should be changed to increase the efficiency.

A four or five element tube may also be used for the production of oscillations according to my invention and in some cases may have advantages due to ease of control.

A further object of my present invention is to provide an electron discharge device in which potentials on different portions of an anode fluctuate in such a manner that after a certain portion has experienced a maximum potential sufficient to start a cloud of electrons toward it, from the cathode, as the electrons are about to impinge thereon the voltage on the portion has changed whereby fluctuations in anode potential cause regeneration and sustained oscillation without the necessity for potential fluctuations of a control element or grid as ordinarily used.

To accomplish the foregoing objects I provide an electron discharge device having an anode substantially a half wave length long, the wave length taken corresponding to the frequency of the desired oscillations. During oscillation, therefore, one-half of the anode will be at a maximum potential and the other half at a minimum potential. As the anode transfers potential waves at the velocity of light, and, since the electrons in traveling through the cathode-anode space have a much lower average velocity, the time they require to reach the anode may very well be equal to the time required for the anode to reverse its radio frequency potential. The portion of the anode which is at a maximum potential and tends to attract electrons toward it will, by suitable dimensioning of the tube, be at a minimum potential when the electrons impinge, thereby establishing the necessary condition for sustained oscillation generation at good efficiency.

To increase the efficacy of the foregoing action it is a further object of my invention to provide one or more grids about the cathode so biased that only peak voltages on a fractional part of the anode will attract electrons thereto.

Since the biasing potential, to fulfill the preceding object, will be of such a value that oscillations may not be self starting, it is a further object of my invention to provide means for automatically, if desired, increasing the grid bias with respect to the filament from a small negative value at the time when oscillations are started to a high negative value subsequently.

Still further objects of my invention are to provide means for modulating the oscillations so generated and means for directionally propagating the waves set up by the generated oscillations.

Figure 9:
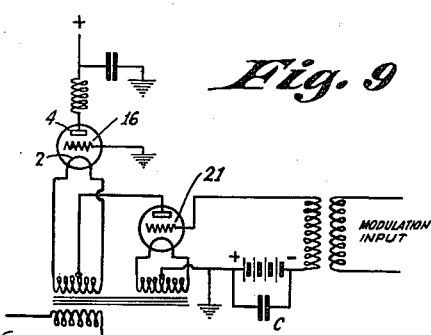
Figure 3:
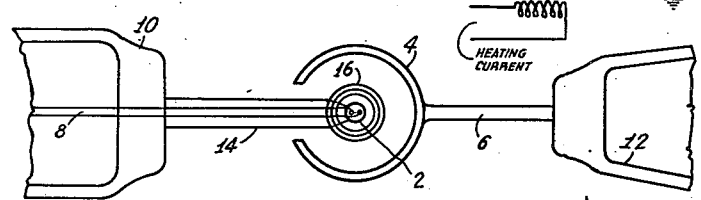
Figure 8:
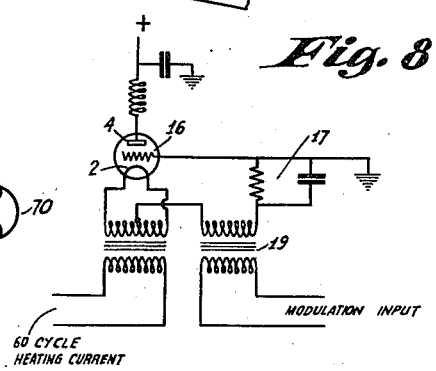
Figure 7:
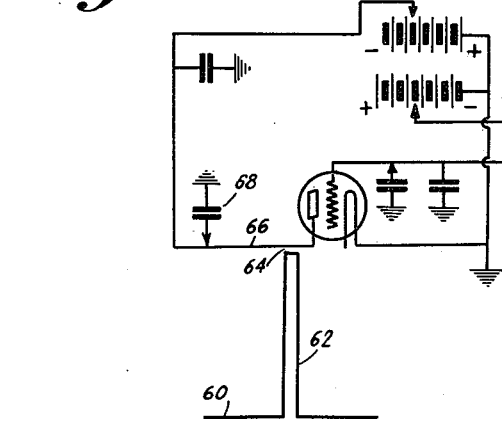
Figure 4:
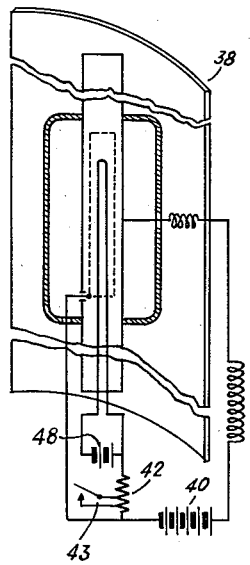
Figure 5B:
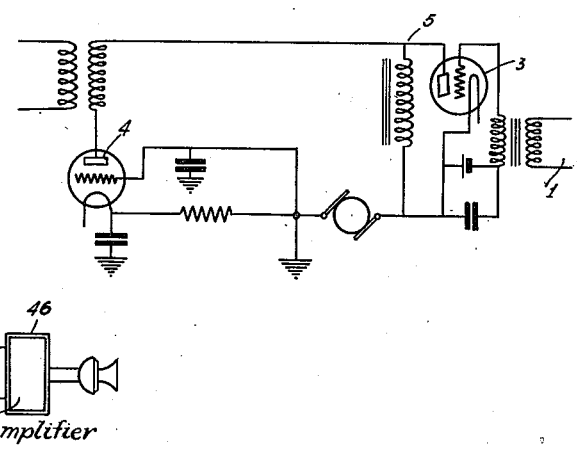
Figure 5A:
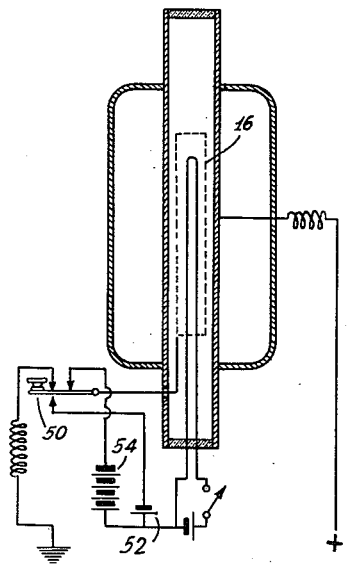
Figure 6:
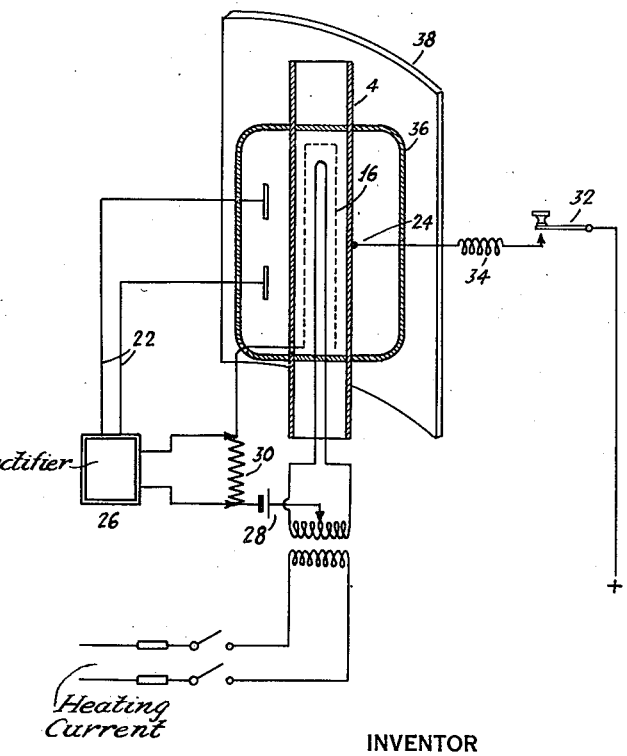

In the accompanying drawings which are given by way of illustration only of my invention, Figure 1 shows a cross section of an electron discharge device and indicates the circuits for a preferred form of oscillator according to my invention, Figure 1a is a plan view of the anode used in Figure 1, Figures 2 and 3 are right angled sectional views of another form of an ultra short wave oscillation generator embodying the principles of my invention and utilizing an anode one-half wave length long, Figure 4 indicates a manner of modulating and directionally propagating the oscillations generated by the oscillators shown in Figures 1, 2, and 3, Figures 5a and 5b disclose other systems for modulating the oscillations generated with my improved oscillator, Figure 6 similar to Figs. 5a and 5b shows, in addition, means for automatically varying the grid bias of my oscillator, Figure 7 illustrates a receiver for receiving oscillations generated by my improved short wave oscillator, and, Figures 8 and 9 illustrate improved modulating circuits according to my present invention.

Referring to Figure 1, a form of oscillator according to my invention is shown in which a cathode 2 is surrounded by an anode 4 which is arranged for water cooling to permit of high energy dissipation and correspondingly large voltage, current and power output.

As shown in Figure 1a, the anode 4 comprises a circular loop placed around the grid and cathode and formed by suitably bending a section of half round tubing, having a cooling fluid inlet 4' and a cooling fluid outlet 4''. The tubing also forms the anode support and anode electrical connection and is run through a seal from the evacuated chamber to the outside, where cooling fluid connections may be made.

Cathode heating is supplied by current from source 50 through leads 8. A grid 16 is mounted in suitable fashion between the anode and cathode. A resistance 60 with radio frequency by pass condensers 70 serves to cause a potential drop due to the current from generator 80 passing through the tube from anode to cathode. This potential drop makes the filament positive with respect to the grid or, in other words, serves to make the grid negative with respect to the filament. The resistance serves to automatically vary the bias so that there is an initial flow of anode current when the power is turned on which will permit oscillations to start, after which the bias is automatically increased after the anode current increases with the starting of the oscillations.

For tuning the anode to maximum radio frequency impedance, the by pass condenser 90 is used to cause short circuit reflection at a point equivalent to an odd number of quarter waves from the working part of the anode, that is, from the portion of the anode struck by emitted electrons. By pass condenser 100 is used in connection with the grid lead at a point approximately an even number of quarter waves from the working part of the grid and serves to produce substantially a tuned short circuit from the working part of the grid to ground so that little radio frequency potential is present on the grid. As an alternative to this condition, an adjustment may be made such that some radio frequency potential exists on the grid having substantially the same phase as the potential of the plate. The plates of condensers 90 and 100 shown in Figure 1 form a capacity to ground to which the cathode is connected through condenser 70. The capacity to ground is obtained through the space between the condenser plates and the frame work of the assembly or shielding, which will surround it in practice. However, it is not essential for the operation of the scheme that condensers 90 and 100 have a capacity to any particular physical object at ground potential The leads from the grid and anode form single conductor transmission lines upon which standing waves may be developed. It is only necessary for the condensers 90 and 100 to cause a relatively large change in characteristic impedance of the lines at the points where the condensers are attached in order for the condenser plates to cause reflection as if the condensers were grounded through a relatively large capacity at these points. The same effect is obtained in any transmission line if there is an abrupt change from one size of conductor to another greatly different in size. Such a change in physical dimensions of the conductor always results in a reflection. If the change is to a lower impedance there results the equivalent of a short circuit reflection whereas if it is to a higher impedance there results an open circuit type reflection. The reflection is not 100%, but it is not necessary to have it 100% to carry out the functions described.

With this combination of tube and circuit the grid repels the electrons emitted from the cathode and will not permit them to pass to the anode except when the radio frequency potential on the anode adds to the D. C. potential supplied by generator 80 to give a maximum value. At this time electrons are drawn through the grid and accelerated toward the anode. However, by the time they reach the anode, the radio frequency potential of the anode has reversed itself and the electrons impinge upon the anode when its potential is least positive and preferably negative. This is the condition for sustained oscillation just as in the ordinary three element vacuum tube.

Of course there is a relation between the tube voltages and the frequency which must be satisfied, and this relation must be such that the time required for the electrons to travel from the grid to the anode is substantially equal to the time of a half cycle of an oscillation.

As indicated, the portion of the anode structure between condenser 90 and the tube, including the anode portion surrounding the cathode and a part of the anode stem, is tuned for one-quarter wave resonance or some multiple thereof so that the anode is tuned for the operating frequency. For very short waves, the distance between the tip of the anode stem 4', 4'' and condenser 90 should preferably be a multiple of a quarter wave, and a second by pass condenser should be located at the point where the water is admitted from a rubber hose or other flexible connection.

If desired, the tube energy may be directly radiated. However, a transmission line may be coupled to points spaced along the anode stem and the tube energy taken from the line to an antenna system. In this event, the tube should be suitably shielded.

My oscillator shown in Figures 2 and 3 consists of a cathode 2 preferably of the heater type, since that form of cathode has a cylindrical electron emitting surface of large area and relatively low temperature and initial electron velocities. The anode 4 is supplied with unidirectional anode potential by a lead and support 6 connected substantially to the midpoint of anode 4. Anode 4 is preferably made one-half wave length long at a wave length corresponding to the desired frequency of oscillation. Cathode energy is supplied through leads 8 and, the cathode, grid and anode are suitably supported as shown upon glass presses 10, 12, lead 6 supporting the anode and column 14 supporting the cathode. As shown in Figure 2 the anode 4 encircles cathode 2 in order to maintain symmetry in the space between anode and grid and increase the power output of the tube.

As so far described, pushpull oscillations will be set up in the anode since the upper and lower portions thereof will alternately be at maximum and minimum potentials. Assuming the upper half to be positive, electrons are drawn towards it from the cathode but, as they arrive, the potential of the upper half will have changed to a minimum value thereby satisfying the condition for oscillation generation.

To increase power output and the efficiency of operation, a cylindrical grid 16 is provided consisting of a wire helix 18 held rigid by suitable longitudinal wires welded to it. Biasing potential is applied to the grid through a lead 20.

By maintaining the grid or control electrode 16 at a suitable negative potential, electrons will be drawn towards that fractional portion of the anode which is substantially, at a given brief time, at a maximum positive potential. During that brief time, electrons are drawn through the grid and accelerated towards that portion of anode which is at a peak of potential. With proper adjustment of the electrodes and potentials, electrons will arrive at the anode when its potential has changed from a maximum positive to a minimum value. The electronic current, therefore, strikes an anode portion when the potential is minimum, tending to drive the potential at that portion of the anode still lower, thereby satisfying the condition for sustained oscillation generation.

Since the value of grid potential to give best efficiency in the generation of oscillations requires adjustment to such a negative value that oscillations may not start, it is desirable to adjust the value of the potential on the grid from a minimum negative value when starting, to a maximum negative potential during constant operation. In one method of doing this I make use of the arrangement shown in Figure 6 wherein a portion of the output of the oscillator is taken, by means of a line 22 coupled capacitively, as shown, symmetrically about the voltage nodal point 24 of the anode 4, and fed to a rectifier 26. An initial biasing potential may be supplied by a source 28 through resistance 30 to the control electrode 16. However, as oscillations increase the voltage applied across resistance 30 from rectifier 26 is made in such a direction as to increase the negative bias on the grid.

Modulation may be accomplished by varying the plate voltage by means of a suitable relay or key 32 or, in the case of telephony by the Heising system of modulation in the lead connecting the source of plate potential through a radio frequency choke 34 to the mid point of anode 4 one-half wave length long. Anode 4 may be entirely within the envelope 36 or preferably, it protrudes as shown. In order to directionally propagate the waves set up by the oscillations in the anode a parabolic reflector 38, spaced an odd number of quarter wave lengths away from the anode 4 and preferably one-quarter wave length therefrom, is provided.

Cathode energization may be accomplished by the use of alternating currents as shown in Figure 6, or, as shown in Figure 4 by unidirectional source 48. If desired, as shown in Figure 4, a resistance 42 of proper value inserted in the path by which the anode current returns from the cathode may be utilized for giving the grid a negative bias with respect to the filament which will not only allow the oscillations to start but which will serve to automatically increase the bias after oscillations have started. A short circuiting switch 43 or shunt resistance (not shown) across a portion of the resistance may be provided at times when oscillations are difficult to start. Rather than key the anode voltage, it may be varied, for modulating purposes, by means of potentials introduced through the action of transformer 44 supplied with amplified modulating currents by amplifier 46. As in Figure 6, unidirectional radiation of the waves generated may be obtained by the use of a reflector 38.

Modulation may not only be accomplished by varying plate voltage but it may also be accomplished as shown in Figure 5a by varying grid bias. Thus, by manipulation of key 50 either the potential of source 52 or source 54 is applied to the grid 16. Because of the high negative potential imparted by source 54 oscillations are, of course, stopped which will indicate a space whereas, application of source 52 will allow of oscillation generation and indicate marking. If desired the grid potential may also be modulated continuously and is capable of giving sufficient modulation of the transmitter output.

Figure 5b shows a method of modulating the oscillator by means of the Heising modulation system varying the potential of anode 4, and in which the grid bias will automatically follow the modulation to allow oscillation over a large degree of modulation. Modulating energy at circuit 1 applied to tube 3, varies the potential at point 5 and consequently the potential on tube 4.

The foregoing methods of modulation cause the frequency to be varied as well as the strength of the emitted wave and either the variation in frequency or the variation in amplitude or both may be utilized to obtain the response in a receiver. If it is desired to modulate only the strength of the emitted waves and to keep the frequency substantially constant I prefer to modulate the potential difference between grid and filament. Figures 8 and 9 show two of a number of methods by which this may be done.

Thus, referring to Figure 8 by the action of a grid leak and condenser combination 17, the grid 16, due to rectified current flow of oscillatory energy from the oscillator will be maintained at a suitable potential with proper choice of values for the resistance and condenser of the combination 17. This initial grid bias is varied by the algebraic addition of modulating potentials to the grid circuit through the acton of modulation transformer 19. The cathode or filaments, of course, may be heated by alternating currents as indicated.

A possible alternative arrangement is shown in Figure 9, modulating potentials being applied to the input electrodes of a modulating tube 21. Obviously variations in the modulation input cause the potential of cathode 2 of my improved oscillator to vary with respect to ground producing effectively a varying grid potential on the grid 16 of my improved oscillator. In this manner, the strength of the emitted waves from my improved oscillator is varied in accordance with the modulation input.

In order to receive and translate modulated oscillations transmitted by any one of the oscillators so far described, a receiving system such as shown in Figure 7 may be utilized. This receiving system employs a three element vacuum tube having a positive potential on the grid and negative on the plate after the arrangement devised by Barkhausen. Adjustments of the tube voltages and circuit tuning are made until the tube approaches the condition for oscillation after the manner described by Barkhausen and Kurz at the same frequency as the transmitter. The combination of tube and circuits then form a sensitive regenerative receiver. Energy picked up on pick up wires 60 is fed through transmission line 62 through inductive coupling at 64 through the anode lead 66 tuned by a condenser 68. Variation in anode potential will cause the average grid current drawn to vary whereby an indication will be obtained in the receiver 70.

Having thus described my invention, what I claim is:

1. The method of signaling in a system including an electron discharge device oscillator having a cathode, a control electrode, a hollow anode surrounding said cathode and control electrode which includes generating oscillations by attracting electrons to portions of the anode and then decreasing the anode voltage on the portions as the electrons arrive, modulating the oscillatory energy so generated, and radiating the modulated energy.

2. The method of signaling in a system including an electron discharge device oscillator having a cathode, a control electrode, a hollow anode surrounding said cathode and control electrode which includes generating oscillations by attracting electrons to portions of the anode and then decreasing the anode voltages on the portions as the electrons arrive, modulating the oscillatory energy so generated, and directionally radiating the modulated energy.

3. The method of generating radio frequency oscillations with an electron discharge device having a cathode, a control electrode, and an anode surrounding said cathode and control electrode, and an anode circuit tuned to a frequency such that the time required for electrons to travel over the control electrode-anode space is substantially equal to the time of one-half cycle corresponding to the tuning of the anode circuit, which includes biasing the control electrode so that electrons are pulled through the control electrode only when the anode potential is a maximum due to high frequency oscillation of the anode circuit.

4. In an electron discharge device, having a hollow anode and a cathode within said anode, the method of generating oscillations which includes attracting electrons towards a fractional portion of the anode, and decreasing the voltage on that portion of the anode as the electrons arrive.

5. In an electron discharge device oscillator, having a hollow anode, a cathode within said anode, and a control electrode in the form of a helix intermediate said anode and cathode, the method of generating oscillations which includes attracting electrons to portions of the anode only at times when the portions of the anode are subjected to a maximum anode potential, and decreasing the anode potential on the portions as electrons arrive.

6. An electron discharge device oscillator comprising an electron discharge device having an anode and a source of potential for said anode, and a cathode within said anode, an anode circuit tuned to a frequency such that the time required for electrons to travel between a pair of electrodes of the device is substantially equal to the time of one-half cycle corresponding to the tuning of the anode oscillation circuit.

7. An electron discharge device oscillator comprising an electron discharge device having an anode and a control electrode within said anode, a source of potential for said anode, and an anode circuit tuned to a frequency such that the time required for electrons to travel between said control electrode and said anode is substantially equal to the time of one-half cycle corresponding to the tuning of the anode oscillation circuit.

8. In an electron discharge device, a hollow anode and a cathode axially disposed within said anode and means for suitably energizing same, said anode and cathode having such dimensions that after electrons are attracted towards a portion of the anode, they arrive at said anode portion when the anode voltage on said portion changes to a value less than the maximum applied voltage.

9. In an electron discharge device, a hollow anode tuned to a multiple of a half wave length long, a cathode axially disposed within said anode and a control electrode between said anode and cathode and means for suitably energizing same, said anode, cathode and control electrode having such dimensions that the electrons attracted towards a portion of the anode arrive at that portion of the anode a time later when that portion of the anode is subjected to a substantially minimum potential.

10. In an electron discharge device, a hollow anode tuned to a multiple of a half wave length, a cathode and a control electrode within said anode, and means for applying a potential on said anode and a bias on the control electrode such that only that portion of the anode which is subjected to maximum anode potential draws electrons thereto.

11. An electron discharge device oscillator comprising a hollow anode tuned to a multiple of a half wave length, a cathode and a control electrode within said anode, means for modulating the oscillations generated by the oscillator, and means for transmitting the modulated oscillations.

12. In an electron discharge device oscillator, a hollow anode tuned to a multiple of a half wave length, a cathode and a control electrode within said anode, means for modulating the oscillations generated by the oscillator, and means for directionally propagating the modulated oscillations.

13. An electron discharge device oscillator, having an anode, a cathode and a control electrode, the anode being tuned to a multiple of a half wave length, and means for automatically increasing the control electrode bias as the oscillations of the oscillator increase from a minimum to a maximum value.

14. The method of generating radio frequency oscillations with an electron discharge device having an anode encircling a cathode and a control electrode, and an anode circuit tuned to a frequency such that the time required for electrons to travel over the control electrode-anode space is substantially equal to an integer times the period of one-half cycle corresponding to the tuning of the anode circuit which includes biasing the control electrode so that electrons are pulled through the control electrode only when the anode potential is a maximum due to high frequency oscillation of the anode circuit.

15. An electron discharge device oscillator comprising an electron discharge device having a hollow anode, a cathode, and control electrode within said anode, and an anode circuit tuned to a frequency such that the time required for electrons to travel between a pair of electrodes of the device is substantially equal to an integer times the period of one-half cycle corresponding to the tuning of the anode oscillation circuit.

16. An electron discharge device oscillator comprising an electron discharge device having a cylindrical anode and a control electron within said anode, and an anode circuit tuned to a frequency such that the time required for electrons to travel between said control electrode and anode is substantially equal to an integer times the period of one-half cycle corresponding to the tuning of the anode oscillation circuit.

17. An electron discharge device oscillator having an anode, a cathode and a control electrode, the anode being tuned to a multiple of a half wave length, and means for increasing the control electrode bias in accordance with a change in amplitude of the oscillations.

18. In an electron discharge device, a hollow anode structurally designed to be tuned to one-half wave length, a cathode within said anode, and a grid electrode intermediate said anode and cathode, and means for applying a potential to the anode and a negative bias to the control electrode such that only that portion of the anode which is subjected to a maximum anode potential draws electrons from said cathode thereto.

19. In an electron discharge device, a hollow anode structurally designed to be tuned to a multiple of a half wave length, a cathode within said anode, and a grid electrode intermediate said anode and cathode, means for applying a suitable potential to said anode at the midpoint thereof, and means for applying a negative bias on the grid such that only that portion of the anode which is subjected to the maximum anode potential draws electrons thereto.

20. The method of generating radio frequency oscillations with an electron discharge device having an anode, a cathode and a control electrode, and an anode circuit tuned to a frequency such that the time required for electrons to travel over the control electrode-anode space is substantially equal to an integer times the period of one-half cycle corresponding to the tuning of the anode circuit which includes biasing the control electrode so that electrons are pulled through the control electrode only when the anode potential is a maximum due to high frequency oscillation of the anode circuit.

21. An electron discharge device oscillator comprising an electron discharge device having an anode circuit tuned to a frequency such that the time required for electrons to travel between a control electrode and an anode of the device is substantially equal to an integer times the period of one-half cycle corresponding to the tuning of the anode oscillation circuit.

22. The method of generating radio frequency oscillations with an electron discharge device having an anode, a cathode and a control electrode, means for maintaining said anode and control electrode at suitable potentials relative to said cathode, and an anode circuit tuned to a frequency such that the time required for electrons to travel over the control electrode-anode space is substantially equal to the time of one-half cycle corresponding to the tuning of the anode circuit, which includes biasing the control electrode so that electrons are pulled through the control electrode only when the anode potential is a maximum due to high frequency oscillation of the anode circuit.

CLARENCE W. HANSELL.